3,271,378
PROCESS OF POLYMERIZING ACETYLENE AND
    DERIVATIVES THEREOF
Wiley E. Daniels, Easton, Pa., assignor to General Aniline
 & Film Corporation, New York, N.Y., a corporation of
 Delaware
No Drawing. Filed Nov. 8, 1963, Ser. No. 322,506
          6 Claims. (Cl. 260—91.3)

The present invention relates to the process of polymerizing aectylene, mono- and di-substituted derivatives thereof.

Recent chemical literature teaches that nickel halide trisubstituted phosphine complexes must be first reduced by reagents such as sodium borohydride, lithium aluminum hydride and boron hydride to yield intermediates which are then useful as catalysts in the polymerization of acetylene and monosubstituted acetylenes. M. L. H. Greene, M. Nehme and G. Wilkinson, Chem. Ind. (London), 1136 (1960); L. B. Luttinger, J. Org. Chem., 27, 1591 (1962), also L. B. Luttinger and E. C. Colthup, J. Org. Chem., 27, 3752 (1962). With such catalyst, acetylene polymerizes essentially into a black linear polymer of very low yield averaging about 3.5 to 6 grams of polymer per gram of catalyst. The polymer chlorinates with difficulty and in very low yields.

It is the principal object of the present invention to provide an improved process of polymerizing acetylene and derivatives thereof while avoiding the costly reducing treatment of the trisubstituted phosphine complexes of nickel halides.

A further object is to provide an improved process whereby higher yield of acetylenic polymers are obtained which are capable of chlorination in fairly high yields.

Other objects and advantages will become more clearly apparent from the following description.

I have discovered that polymers of acetylene and of mono- and di-substituted derivatives thereof can be obtained in fairly high yields by conducting the polymerization reaction in the presence of a nickel halide trisubstituted phosphine complex as a catalyst without first reducing the said complex with the aforementioned costly reagents. The polymerization is conducted in solution either at ambient pressures and elevated temperatures (reflux) or, in the case of acetylene itself, in an autoclave diluted with an inert gas such as nitrogen at temperatures of from —40° to 200° C., and pressures of up to 200 p.s.i.g. in the presence of a nickel halide trisubstituted phosphine complex of the following formula:

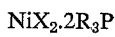

wherein X represents bromine, chlorine or iodine, and R represents at least one member of the group consisting of alkyl of from 1 to 12 carbon atoms, e.g., methyl, ethyl, butyl, hexyl, octyl, decyl or dodecyl, cycloalkyl of from 5 to 6 carbon atoms, e.g. cyclopentyl or cyclohexyl, aryl and aralkyl, e.g. phenyl, tolyl, naphthyl and benzyl. R may be the same or different such as dimethylphenyl, diphenylethyl, methyldiphenyl, benzylphenylpropyl, cyclohexyldiphenyl, 2-napthyldiphenyl; etc.

The catalysts characterized by the foregoing formula are readily prepared in accordance with the procedure described by Venanzi, J. Chem. Soc. 719, 1958 and Cotton, J. Am. Chem. Soc., 83, 344 (1961), and Venanzi, J. Chem. Soc., 2705 (1961).

As illustrative examples of such catalysts, the following may be mentioned:

(bis-triphenylphosphine dibromo nickel II)
(bis-triphenylphosphine dichloro nickel II)
(bis-triphenylphosphine di-iodo nickel II)
(bis-tri-ni-butylphosphine dibromo nickel II)
(bis-triethylphosphine dibromo nickel II)
(bis-diethylphenylphosphine dichloro nickel II)
(bis-ethyl-diphenylphosphine dibromo nickel II)

The nickel II represents that it is divalent nickel.

In addition to acetylene, the mono- and di-substituted acetylenes which may be polymerized with the foregoing catalysts are characterized by the following general formula:

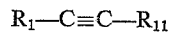

wherein $R_1$ represents either hydrogen, alkyl of from 1 to 12 carbon atoms, e.g. methyl, ethyl, propyl, butyl, pentyl, hexyl, octyl, nonyl, decyl and dodecyl, cyclopentyl, cyclohexyl, phenyl, tolyl, naphthyl, cyano methylol ($-CH_2OH$) or iso propyl ($-C(CH_3)_2OH$), and $R_{11}$ represents either hydrogen, methyl, methylol, cyano or phenyl.

As illustrative of such acetylenic compounds, the following may be mentioned:

acetylene
methyl acetylene (propyne)
butyl acetylene (1-hexyne)
n-propyl methyl acetylene (2-hexyne)
octyl acetylene
dodecyl acetylene
cyclohexyl acetylene
phenyl acetylene
diphenyl acetylene
tolyl acetylene
2-naphthyl acetylene
3,3-dimethyl proyn-ol-3
dicyano acetylene
propargyl alcohol
2-butynediol-1,4

The process of the present invention has several decided improvements over the prior art in that (1) the use of the expensive sodium borohydride and other costly reducing reagents is eliminated, (2) the polymerization system yields polymers which react with chlorine to give chlorinated polymers of about 62% chlorine content, (3) better yields of polymers with less inorganic contaminants are obtained, and (4) with substituted acetylenes linear polymers of higher molecular weight are obtained.

In conducting the polymerization reaction, the nickel halide-trisubstituted phosphine complex may be dissolved in a variety of inert-solvent diluents such as, for example, dioxane tetrahydrofuran, or a mixture of either one of the latter with an alcohol of from two to four carbon atoms or a mixture of tetrahydrofuran with benzene, acetone, methyl ethyl ketone, cyclohexane, toluene, acetonitrile, or the like.

In general, the catalyst should be present in solution with the acetylenic compound to be polymerized at a weight ratio of 1 of catalyst to 15 of acetylenic compound at the lowest and 1:5 at the highest.

The weight ratio of solvent to the total weight of catalyst plus acetylenic compound should be about 10:1 in the case of acetylene, and may be less, i.e. 3:1 or 5:1 in the case of the other acetylenic compounds.

The polymerization reaction is generally completed in a period of time ranging of from 10 to 48 hours. The polymer is isolated by filtration and then purified by either washing with solvent such as for example acetone, ethanol, tetrahydrofuran, etc., or by precipitation from solution with methanol.

With acetylene, high molecular weight black poly (acetylene) and oily polymers are obtained which range in color from yellow to red and which behave as drying oils. With hexyne-1 a linear polymer is formed together with fair amounts of a high boiling liquid showing an infra-red spectrum characteristic of a symmetrically substituted trialkyl benzene. With phenyl acetylene a yellow solid is obtained whose properties show it to be a poly (phenylacetylene) and minor amounts of cyclic aromatic trimers and linear trimers. Propargyl alcohol yields a rust colored solid whose properties show it to be poly (propargyl alcohol) of the following formula:

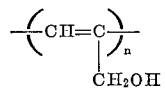

2-butynediol-1,4 yields a solid whose infra-red spectrum is similar to that of all of the above polymers and is characterized by the following structure:

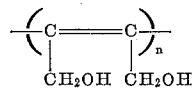

The following examples will illustrate the polymerization of acetylene, mono- and di-substituted acetylenes with nickel halide trisubstituted phosphine complexes as catalysts.

*Example I*

In a 1 liter stainless steel autoclave was placed a solution of 3.7 grams of (bis-triphenylphosphine dibromo nickel II) in 500 mls. of tetrahydrofuran (nickel II represents that it is divalent nickel). The autoclave was closed and flushed three times with nitrogen at 100 p.s.i.g. The starting pressure was then adjusted with nitrogen to 70 p.s.i.g. and acetylene added to a total pressure of 200 p.s.i.g. In 45 minutes an exotherm was noted in which the internal temperature rose from 19° to 185° C., with a pressure buildup to 600 p.s.i.g. or more. The temperature and pressure fell back to normal (20°+200 p.s.i.g.) in about 2 hours and the polymerization was carried out for a total time of 18 hours at 18–20° C. and 200 p.s.i.g. pressure.

The autoclave was opened, and the black solid which was present was washed with fresh tetrahydrofuran and dried to constant weight, whence 28.5 grams of a black, fairly easily powdered solid was obtained. The material contained 82.7% C, 7.13% H, and 5.1% ash.

Calculated for $(CH=CH)_n$ is C, 92.3%; H, 7.7%. Its infra-red spectrum was similar to Green et al.'s polymer.

*Example II*

10.0 grams of poly (acetylene) prepared in accordance with Example I were crushed under nitrogen and transferred to a 500 ml. flask equipped with gas inlet tube, reflux condenser, stirrer, and thermometer. It was suspended in 400 mls. of carbon tetrachloride. Chlorine was admitted over a 2½ hour period. The reaction mixture stood overnight, after which a white solid was present. Little hydrogen chloride had formed.

The white solid was filtered, washed with fresh $CCl_4$ and dried to constant weight in vacuum, when 22.0 grams of white solid were obtained. This material contained 35.5% C, 2.9% H, and 56.0% Cl.

*Example III*

In a 1 liter stainless steel autoclave was placed a solution of 3.7 grams of (bis-triphenylphosphine dibromo nickel II) in 500 mls. of a solvent consisting of 50 mls. tetrahydrofuran and 450 mls. absolute ethyl alcohol. The autoclave was purged 3 times with nitrogen at 100 p.s.i.g. and then starting pressure adjusted to 70 p.s.i.g. with nitrogen. Acetylene was admitted with stirring to a total of 140 p.s.i.g. The polymerization was carried out under these conditions for 24 hours. No exotherms were noticed. The autoclave was opened and the solid black polymer isolated as in Example 1.

47.0 grams of a black, very easily powdered solid was obtained. This is a yield of over 12 parts of polymer per one part of catalyst. This material contained 86.05% C, 7.72% H, and 5.31% ash.

Calculated for $(C_2H_2)_n$ was 92.3% C, 7.7% H.

*Example IV*

10.0 grams of poly (acetylene) of Example III washed with solvents to yield a material containing only 1.08 gram of inorganic residue, was slurried with 350 mls. of carbon tetrachloride and cooled to 10° C. 4.0 grams of chlorine were added over 26 minutes. Nearly all the material turned white at this time. 1,000 mls. of carbon tetrachloride were now added and the unreacted, coated lumps of poly (acetylene) crushed with a glass rod. After another 3 hours nearly all the black poly (acetylene) was converted to white chlorinated product. This product was filtered, washed with fresh carbon tetrachloride and dried to constant weight in vacuum. 27.4 grams of final product were obtained, very white, evolving no hydrogen chloride from the solid, and containing 31.35% C, 2.68% H, 62.84% Cl and 2.80% ash.

*Example V*

To a 1 liter autoclave as in Example I was added a solution of 3.3 grams of (bis-triphenylphosphine dichloro nickel II) in 500 mls. of tetrahydrofuran. The reaction was carried out at ambient temperatures and at 70 p.s.i.g. of nitrogen and 40 p.s.i.g. of acetylene for 20 hours. The product of this reaction was a dark brown polymer. 2.1 grams were obtained.

*Example VI*

To a 1 liter autoclave as in Example I was added a solution of 3.3 grams of (bis-triphenylphosphine di-iodo nickel II) in 500 mls. of tetrahydrofuran. The polymerization was carried out at ambient temperature and at 70 p.s.i.g. of nitrogen and 40 p.s.i.g. of acetylene. After about eight hours, there was an exotherm to 75° C. After this subsided, the reaction was carried out at ambient temperatures for 14 hours.

The autoclave was vented and the polymer isolated as in Example I. There were obtained 20.0 grams of black poly (acetylene).

*Example VII*

To a 1 liter autoclave was added a solution of 3.3 grams of (bis-n-tributylphosphine dibromo nickel II) in 500 mls. of tetrahydrofuran. The polymerization was carried out for 20 hours at ambient temperatures and partial pressure of nitrogen, 70 p.s.i.g. and acetylene, 70 p.s.i.g. Only a mild exotherm was observed. The autoclave was vented and the black poly (acetylene) isolated as in Example I. There were obtained 20.0 grams of black polymer.

*Example VIII*

A solution of 5.0 grams of (bis-triphenylphosphine dibromo nickel II) and 86.0 grams (1.0 mole) of 2-butynediol-1,4 in 250 mls. of tetrahydrofuran (purified) was refluxed in a system open to the atmosphere for 24 hours. A light colored solid was present at the end of this time. It was filtered and dried at 70 mm. of mercury for several days. This solid, less than 3.0 grams, was insoluble in water, alcohols, tetrahydrofuran, and benzene. It showed an infra-red spectrum consistent with the structure.

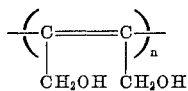

It was infusible, and probably cross-linked to some degree. The filtrates contained unchanged butynediol mainly, but some very small amount of a dark oily material.

*Example IX*

To 5.0 grams of (bis-triphenylphosphine dibromo nickel II) dissolved in 100 mls. of tetrahydrofuran (purified) there were added 31.0 mls. (.26 mole) of phenyl acetylene, and the mixture refluxed. After 18 hours' reflux time there was present a yellow solid. This was filtered and set aside. The filtrate yielded a viscous brown oil which on first dissolving in 100 mls. of chloroform followed by the addition of 300 mls. of methanol deposited some more of the yellow solid. This was combined with the first crop of yellow solid and dried in vacuum to yield 4.7 grams of product.

The yellow solid showed an infra-red spectrum identical with that of a sample prepared by Okamato, Chem. Ind. Dec. 9, 1961. It showed a molecular weight of 980 by freezing point depression in benzene. It contained 88.66% C and 6.01% hydrogen. Its electrical properties (a semi-conductor) were similar to those described by Okamato.

*Example X*

To 5.0 grams of (bis-triphenylphosphine dibromo nickel II) dissolved in 250 mls. of tetrahydrofuran were added 55 mls. (0.5 mole) of 1-hexyne. The solution was refluxed for 14 hours, and a small amount of solid was formed during this time. This solid, or filtration, darkened on exposure to air and hence was not worked further. The filtrate was concentrated to dryness in a flash evaporator on a steam bath and water aspirator. The residue was a mixture of dark green solid and brown oil. The oil was decanted into a small distilling apparatus, and represented 28.4 grams of crude polymer. Distillation at reduced pressure yielded the following fractions:

(1) B.P., 127–134° C./2–3 mm.—12 mls. $n_D^{25}$ 1.4872.

(2) B.P., 139–158° C./2–3 mm.—2 mls.

(3) Residue did not distill at 180° C./2–3 mm.

The foregoing fractions and residue were examined in the infra-red and showed:

(1) Aromatic

 at 1500, 1600 cm.$^{-1}$

 at 707, 850 cm.$^{-1}$ (2) Similar to (1), but aromatic bond less intense.

(3) Weak aromatic bond, mainly aliphatic at 725 cm.$^{-1}$.

Thus, it would appear that the products (1) and (2) are in part 1,3,5-tributylbenzene. Meriwether et al., Jour. Org. Chem., 26, 5155, 5163 and 5169 (1961), list for their 1-hexyne product the refractive index of 1.4893 $n_D^{25}$. They state that the liquid is a mixture of linear trimers, tetramers and aromatic trimers. The molecular weight of the products of the above products must, therefore, be in the same range as those reported by Meriwether et al.

*Example XI*

To a solution of 5.0 grams of (bis-triphenylphosphine dibromo nickel II) dissolved in 350 mls. of tetrahydrofuran (purified) there were added 150 mls. (145 g., 2.6 moles of propargyl alcohol freshly distilled. The entire reactant charge was placed in a 1 liter stainless steel rocker autoclave, purged with nitrogen three times at 100 p.s.i.g. then heated at 100° C. and held there for 24 hours.

On discharge of the autoclave a large amount of a rust colored solid was present. This was filtered and washed with methanol. After drying in vacuum to constant weight, 30 grams of rust colored solid were obtained. The material burned fiercely on ignition and gave an infra-red spectrum consistent with the structure

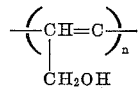

20.6% conversion. Elemental analysis showed: 63.57% C., 6.40% H, 1.1% Ni, 0.72% Br, and 0.37% P, as trace impurities. Calculated for $(C_3H_4O)_n$, C. 64.0%, 7.15% H. The filtrate on evaporation yielded 56.0 grams of a viscous, water soluble, oil whose infra-red pattern and molecular weight showed it to be a mixture of 1,3,5,- and 1,2,4-trimethylol benzene, an aromatic polymer of the propynol, 38.7% conversion.

*Example XII*

A solution of 5.0 grams of (bis-triphenylphosphine dibromo nickel II) in 250 mls. of tetrahydrofuran (purified) and 65 grams (1.16 moles) of propargyl alcohol (freshly distilled) were refluxed in a system open to the atmosphere for 24 hours. At the end of this time, a rust colored solid was observed. The solid was filtered off, and dried in vacuum to constant weight and 9.7 grams of rust colored solid obtained. Its infra-red spectrum was consistent with the structure

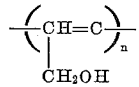

14.9% conversion. No aromatic polymers were found in the filtrate from the above operation.

I claim:

1. The process of polymerizing an acetylenic compound of the formula:

$$R_1-C\equiv C-R_{II}$$

wherein $R_1$ represents a member selected from the class consisting of hydrogen, alkyl of from 1 to 12 carbon atoms, cycloalkyl of from 5 to 6 carbon atoms, aryl, cyano, methylol and iso-propylol, and $R_{II}$ represents a member selected from the class consisting of hydrogen, methyl, cyano, phenyl and methylol, which comprises polymerizing said compound at a temperature of from −40° to 200° C. and a pressure ranging from ambient to 200 p.s.i.g. in the presence of a non-reduced nickel halide trisubstituted phosphine complex having the formula:

$$NiX_2 \cdot 2R_3P$$

wherein X represents a halogen selected from the class consisting of bromine, chlorine and iodine and R represents at least one member of the group consisting of alkyl of from 1 to 12 carbon atoms, cycloalkyl of from 5 to 6 carbon atoms, aryl and aralkyl, and wherein the Ni is divalent.

2. The process of polymerizing acetylene at ambient temperature and a pressure of 200 p.s.i.g. in the presence of non-reduced (bis-triphenylphosphine dibromo nickel) wherein the nickel is divalent.

3. The process of polymerizing 2-butynediol-1,4 in solution of tetrahydrofuran at reflux in the presence of non-reduced (bis-triphenylphosphine dibromo nickel) wherein the nickel is divalent.

4. The process of polymerizing phenyl acetylene in solution of tetrahydrofuran at reflux in the presence of non-reduced (bis-triphenylphosphine dibromo nickel) wherein the nickel is divalent.

5. The process of polymerizing 1-hexyne in solution of tetrahydrofuran at reflux in the presence of non-reduced (bis-triphenylphosphine dibromo nickel) wherein the nickel is divalent.

6. The process of polymerizing propargyl alcohol in solution of tetrahydrofuran at 100° C. and a pressure of 100 p.s.i.g. in the presence of non-reduced (bis-triphenylphosphine dibromo nickel) wherein the nickel is divalent.

References Cited by the Examiner

Green, M. L. H., Nehme, M., and Wilkinson, G., "A New Catalytic System for the Stereospecific Polymerisation of Acetylene," Chemistry and Industry (London), Sept. 3, 1960, page 1136.

JOSEPH L. SCHOFER, *Primary Examiner.*

H. I. CANTOR, *Assistant Examiner.*